US009283906B2

(12) United States Patent
Kaltenbrunner (10) Patent No.: US 9,283,906 B2
(45) Date of Patent: Mar. 15, 2016

(54) VEHICLE WITH A POWER DISTRIBUTOR CONTROL UNIT, AND BISTABLE RELAY

(75) Inventor: Martin Kaltenbrunner, Taufkirchen/Vils (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 832 days.

(21) Appl. No.: 13/562,949

(22) Filed: Jul. 31, 2012

(65) Prior Publication Data
US 2013/0033101 A1 Feb. 7, 2013

(30) Foreign Application Priority Data

Aug. 1, 2011 (DE) .......................... 10 2011 080 226

(51) Int. Cl.
*B60R 16/03* (2006.01)
*H01H 47/22* (2006.01)
*H01H 47/32* (2006.01)

(52) U.S. Cl.
CPC .............. *B60R 16/03* (2013.01); *H01H 47/226* (2013.01); *H01H 47/325* (2013.01)

(58) Field of Classification Search
CPC ...... B60R 16/03; H02H 7/268; H02J 13/0003
USPC ............. 361/93.1; 365/102, 104, 105, 210.11
See application file for complete search history.

(56) References Cited

U.S. PATENT DOCUMENTS

| | | | | |
|---|---|---|---|---|
| RE31,089 E | * | 11/1982 | Adamson | 340/870.19 |
| 4,453,195 A | * | 6/1984 | Sauer et al. | 361/156 |
| 4,455,587 A | * | 6/1984 | Potthof et al. | 361/160 |
| 4,595,967 A | | 6/1986 | Potthof | |
| 5,442,697 A | * | 8/1995 | McGary et al. | 379/399.02 |
| 6,600,640 B1 | * | 7/2003 | Buscher et al. | 361/93.1 |
| 6,650,030 B2 | * | 11/2003 | Has | 307/140 |
| 7,957,862 B2 | | 6/2011 | Kaita et al. | |
| 2005/0162795 A1 | | 7/2005 | Leiber | |
| 2010/0283328 A1 | * | 11/2010 | Eggert | 307/112 |
| 2011/0267157 A1 | * | 11/2011 | Kalmbach et al. | 335/78 |

FOREIGN PATENT DOCUMENTS

| | | |
|---|---|---|
| DE | 31 30 242 A1 | 2/1983 |
| DE | 33 01 866 A1 | 7/1984 |
| DE | 102 43 970 A1 | 4/2004 |

(Continued)

OTHER PUBLICATIONS

German Search Report with English Langauage Translation dated Jun. 22, 2012 (ten (10) pages).

(Continued)

*Primary Examiner* — Jared Fureman
*Assistant Examiner* — James P Evans
(74) *Attorney, Agent, or Firm* — Crowell & Moring LLP (57) ABSTRACT

In a vehicle with a power distributor and a control unit, the power distributor includes a bistable relay with at least one coil. The bistable relay can be set to first and second switching states. The bistable relay has an integrated circuit, wherein a control unit activates the integrated circuit by way of a control line and defines one of the two switching states via a control signal. The control unit applies a first control voltage or a second control voltage to the control line, wherein the first control voltage corresponds to the first switching state, and the second control voltage corresponds to the second switching state. The integrated circuit switches a current pulse through the coil in order to set the bistable relay to the switching state defined by the control unit.

14 Claims, 4 Drawing Sheets

(56) References Cited

FOREIGN PATENT DOCUMENTS

| DE | 10 2006 024 923 | A1 | | 12/2006 | | |
|----|----|----|----|----|----|----|
| DE | 102009002018 | A1 | * | 10/2010 | ............ | H02J 7/0031 |
| DE | 10 2010 018 754 | A1 | | 11/2011 | | |

OTHER PUBLICATIONS

Relaistechnik, Grundlagen and Neueste Entwicklungen. Verlag Moderne Industrie, 86895 Landsberg, 1998, ISBN 3-478-93188-6, pp. 22-27, (four (4) pages).

* cited by examiner

Fig. 1 (State of the Art)

Fig. 2 (State of the Art)

VEHICLE WITH A POWER DISTRIBUTOR CONTROL UNIT, AND BISTABLE RELAY

CROSS-REFERENCE TO RELATED APPLICATION

This application claims priority under 35 U.S.C. §119 from German Patent Application No. DE 10 2011 080 226.6, filed Aug. 1, 2011, the entire disclosure of which is herein expressly incorporated by reference.

BACKGROUND AND SUMMARY OF THE INVENTION

The invention relates to a vehicle with a power distributor and a control unit, wherein the power distributor comprises a bistable relay with at least one coil.

The electrical system of a vehicle has a number of consumer lines, which are supplied with electricity by means of a power distributor. At the same time the individual lines can be disconnected from and re-connected again to the vehicle electrical system by means of a relay. For example, when the vehicle is in a sleep mode, the individual consumer branches are disconnected from the vehicle electrical system, in order to reduce the static current consumption of the vehicle. When the vehicle is awoken, the consumer branches are re-connected again. According to the state of the art, monostable relays, which are switched with a control unit, are usually used for this purpose. Preferably these relays can be inserted, comparable to fuses in a fuse box, into the recesses, which are intended for the relays, in the power distributor. This arrangement makes it easy to access the defective relays and to replace them with unerring certainty.

The German Patent document DE 102 43 970 A1 describes bistable relays that are also used to switch consumer lines in the motor vehicle. In addition, the lines can be monitored at least to some extent with a microcomputer.

The object of the present invention is to provide an improved vehicle with a power distributor and a control unit, wherein the power distributor comprises a bistable relay with at least one coil.

According to the invention, the bistable relay, which can be set to a first switching state and a second switching state, has an integrated circuit, which activates the control unit by way of a control line. In this case the control unit defines one of two switching states by way of a control signal, in that the control unit applies a first control voltage or a second control voltage to the control line. In this context, the first control voltage corresponds to the first switching state, and the second control voltage corresponds to the second switching state. The integrated circuit switches a current pulse through the coil, in order to set the bistable relay to the switching state defined by the control unit.

This feature offers the advantage that the bistable relay is switched over by the integrated circuit, because the coil is supplied by the integrated circuit with the current pulse required to switch over the relay. The control unit is connected to the relay only by way of the control line. The control unit defines the switching state, to which the relay is to be set, over the control line. This arrangement offers the advantage that only one cable strand has to be run from the control unit to the bistable relay in the vehicle. The bistable relay with the integrated circuit can also be referred to as an intelligent relay.

According to a preferred embodiment of the present invention, the integrated circuit determines the switching state of the relay and compares the switching state of the relay with the defined switching state of the control unit. In the event that the determined switching state deviates from the defined switching state, the integrated circuit switches a current pulse through the coil, in order to set the bistable relay to the switching state defined by the control unit.

This approach guarantees that in an undefined switching state or a switching state, which does not correspond to the defined switching state, the relay is set to the defined switching state. A bistable relay can be set to an undefined switching state, when, for example, the relay is subject to a significant mechanical action, such as during a vehicle crash. The automatic resetting of a relay is common typically only in monostable relays that are permanently energized.

Preferably the integrated circuit includes a bridge circuit consisting of four self-blocking n-channel MOSFETs and a logic module. The logic module controls the gate electrodes of the MOSFETs as a function of the control signal of the control unit, in order to switch a current pulse through the coil and to set to the defined switching state.

The use of MOSFETs and the logic module enables the conversion of the integrated circuit as an application specific integrated circuit (ASIC) that is inexpensive and reliable and saves space.

According to an additional variant of the invention, the vehicle has a voltage source, with which the integrated circuit can be supplied with electric voltage at an operating voltage input of the integrated circuit. As a result, the supply of the ASIC with operating voltage is guaranteed. The operating voltage feeds the logic module with electric power and acts as the drain/source voltage of the MOSFETs of the bridge circuit.

In addition, the integrated circuit can also have a redundant voltage supply, so that when the voltage supply at the operating voltage input fails, the integrated circuit can be supplied with electric voltage by the control unit by way of the selection line. This feature offers the advantage that the integrated circuit can be supplied with operating voltage when, for example, an error occurs at the operating voltage input or in the event of a defective in-feed to the voltage source.

Furthermore, it is preferred that the integrated circuit has a control line input and that the control line is connected to the input by way of a plug and socket connection. A first current sink can be downstream of the input of the control line; and a contact cleaning current is adjustable by means of this first current sink by way of the control line.

A contact cleaning current reliably ensures that the integrated circuit stays permanently controllable with the relay. The contact cleaning current prevents the formation of contact resistances at the plug and socket connection.

According to a further development of the present invention, a second current sink is connected in parallel to the first current sink; and a status current is adjustable by the second current sink by way of the control line. The setting of the status current can be controlled by a pulse width modulated signal of the logical module to the second current sink; and the pulse width modulated status current can be determined by the control unit with a current mirror circuit. The data can be stored, as a function of the pulse width of the status current, in the logic module and in the control unit.

This arrangement allows stored data to be transmitted from the integrated circuit to the control unit by way of the pulse width modulation of the status current. This stored data can be, for example, the switching state of the relay or the status or diagnostic data of the relay (for example, "coil malfunction"), data regarding the operating voltage supply of the ASIC (for example, "low supply voltage, test supply") or regarding the logic module (for example, "module defective, replace relay"); the range of data that can be determined depends on the range of functions of the ASIC.

According to a preferred embodiment of the invention, the integrated circuit has a reverse polarity protection function, which opens or closes the relay when an external voltage source is connected with reverse polarity.

There is a case of reverse polarity, when an external voltage source is brought with its higher potential to the vehicle body and with its lower potential to the plus (positive) pole or the remote start polarity of the vehicle. The integrated circuit has a reverse polarity protection circuit, which on the basis of the potential difference in the reverse polarity case and in a defined switching state allows a current flow in the coil in a direction defined by the reverse polarity protection circuit, in order to bring the relay into a different switching state.

For example, the vehicle can be a motor vehicle, a hybrid vehicle or an electric vehicle, which has at least one bistable relay. In this context at least one bistable relay includes an integrated circuit; the power distributor has a plug-in space, in order to integrate at least one bistable relay with an integrated circuit.

The plug-in space has all of the necessary contacts for the intelligent relay. If there are a plurality of intelligent relays, which can be integrated into a power distributor by way of a plug-in space, then the plug-in spaces can be arranged side by side. This arrangement allows a defective relay to be identified with unerring certainty and promptly replaced.

The invention is based on the following presented considerations.

Bistable relays are used in power distributors of motor vehicles or electric vehicles, in order to supply power to the electric consumers. The relays are plugged preferably into power distributor boxes. Soldered, force fitted or welded relays are also used. The current trend in modern vehicles is to use bistable relays in order to reduce, in particular, the power consumption when the vehicle is in running mode and in the immobilization mode. In the case of motor vehicles this strategy reduces the consumption of fuel; in electric vehicles it is possible to gain an extended cruising range.

However, a bistable relay has to be activated by use of an H-bridge circuit, in order to generate current pulses or current surges through the coil of the relay in both directions of current. The bridge circuit is usually a component of a control unit, so that not only the costs for the bridge circuit, but also two lines in the cable harness have to be provided; and these two lines run from the control unit to the bistable relay.

It can be proposed as an improvement, to integrate an electronic package in the form of a printed circuit board with an ASIC (application specific integrated circuit) into the relay. The integrated circuit of the ASIC is provided with operating voltage by way of the control unit or by way of the vehicle electrical system. The pulse selection of the coil by use of current pulses is also carried out by the integrated circuit, wherein the power required for the current pulses also comes from the electrical system of the vehicle.

Since a portion of the vehicle electrical system forms the closed loop control circuit, it is possible to dispense with a cable strand in the vehicle. In stark contrast to the conventional bistable relay, only one selection line runs from the control unit to the bistable relay.

In addition, the switching state of the bistable relay can be diagnosed by use of the integrated circuit. If, for example, in the event of a crash, the bistable relay does not occupy a defined switching position, then this situation is recognized by the integrated circuit; and a current pulse for switching over the relay is emitted.

Thus, the switching over of the relay can be induced by the control unit by way of the control line or by the relay's own diagnosis. This feature enables the use of bistable relays in safety relevant systems and eliminates the need to use permanently energized monostable relays.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
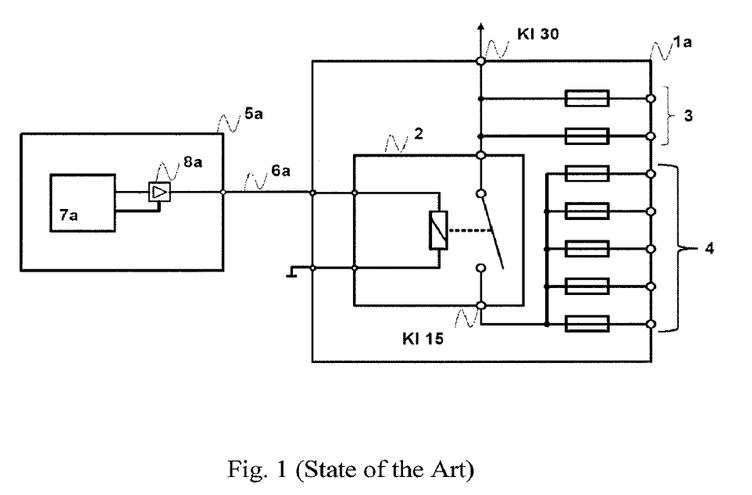
FIG. 1 is a schematic diagram of a vehicle's electrical and electronic system with a control unit, a power distributor and a monostable relay according to the state of the art.

FIG. 1 shows in schematic form a detail of an electrical and electronic system in a vehicle known from the state of the art. For example, a power distributor 1a with a relay for connecting load terminals is shown; such a power distributor is also often called the junction box in automotive engineering. Therefore, the terminal designations according to DIN 72552 are used in FIG. 1 (as well as in FIGS. 2 and 3). The exemplary junction box switches, without loss of generality, through a monostable relay 2, which in this case is designed, for example, as a closing relay. In the "ON" state, the terminal 15 is switched over to the voltage value of the terminal 30. At the same time the terminal 30 is switched over to the plus pole of a electrical system battery of the vehicle. In the "OFF" state of the monostable relay, all of the consumers 4, which are switched over to the terminal 15, are disconnected from the voltage supply, in contrast to the consumers 3, which are switched over to the terminal 30.

In addition, the vehicle has a control unit 5a, which is connected to the junction box 1a by way of a switching line 6a. The control unit has a microcontroller 7a and a high side driver 8a, in order to switch over the monostable relay 2. In the microcontroller the operating strategy of the monostable relay is mapped in terms of circuit technology, that is, the control unit sends a switching current by way of the driver, in order to switch the relay over into the "ON" state.

The monostable closing relays that are currently used in automotive engineering for controlling the terminals have a power consumption of approximately 1-1.5 W in the "ON" state.

Figure 2:
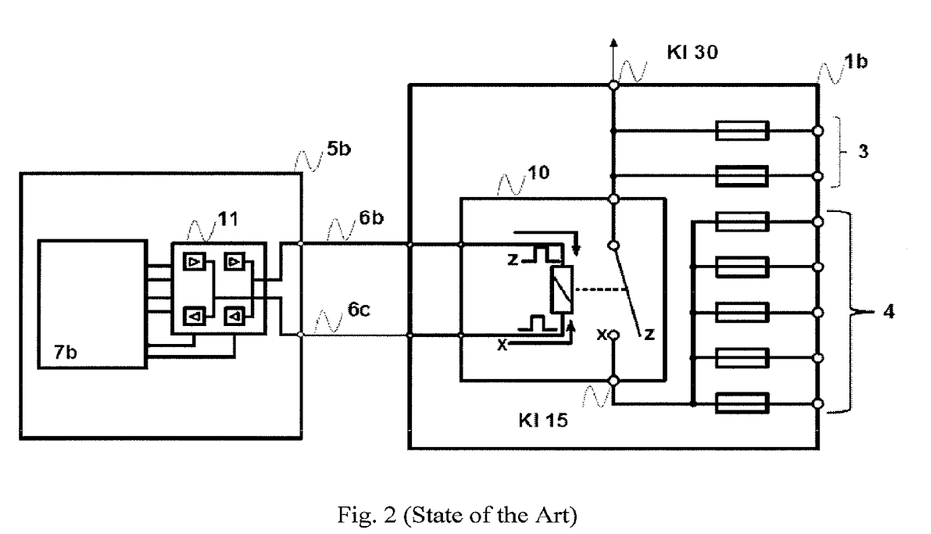
FIG. 2 is a schematic diagram of a vehicle's electrical and electronic system with a control unit, a power distributor and a bistable relay according to the state of the art.

In order to reduce the power consumption in vehicles, that is, in particular, the operating current and/or quiescent power consumption, the state of the art tends to use bistable relays 10, instead of monostable relays 2 (see FIG. 2). Bistable relays usually have a coil with a magnetizable core having a remanence that can be used to maintain a defined switching state of the bistable relay. In this way the bistable relay can be switched by a current pulse flowing through a coil. At the same time the current direction of the current pulse establishes the orientation of the residual field and, thus, the switching state of the bistable relay. In this case the current pulse for setting the relay to a defined switching state comes from a cost intensive full bridge driver and/or an H-bridge driver 11. The drawback with the wiring in FIG. 2 is that two switching lines 6b, 6c have to be laid from the control unit 5a to the bistable relay 10 in the vehicle. Furthermore, the circuit from the state of the art in FIG. 2 is disadvantageous because, for example, in the event of a vehicle crash in an accident situation, the contact holding force is superposed with the crash acceleration forces (up to over 50 g) by way of the residual field of the magnetizable core in the relay, so that the relay may pass over into an undefined switching state. For this reason the state of the art often resorts to monostable relays according to FIG. 1, in order to control crash relevant relays, which have to take a defined switching position, in particular, during a collision. Since these monostable relays are permanently supplied with current, in the event of a jolt a monostable relay will automatically return to the defined switching state, for example "ON" for a closing relay, subject to contact chatter. The requirements for crash relevant relays can be found, for example, in the European regulation EC-R95.

It is possible to use, instead of the bistable relay in FIG. 2, a bistable relay 12 with an integrated circuit in the form of an ASIC (application specific integrated circuit) 13 in a distributor unit, in order to use the advantages of monostable relays and the advantages of bistable relays in the vehicle. This arrangement is described as an exemplary embodiment of the present invention in FIG. 3. The operating voltage of the integrated circuit can be provided at an operating voltage input 14 by way of the terminal 30.

Figure 3:
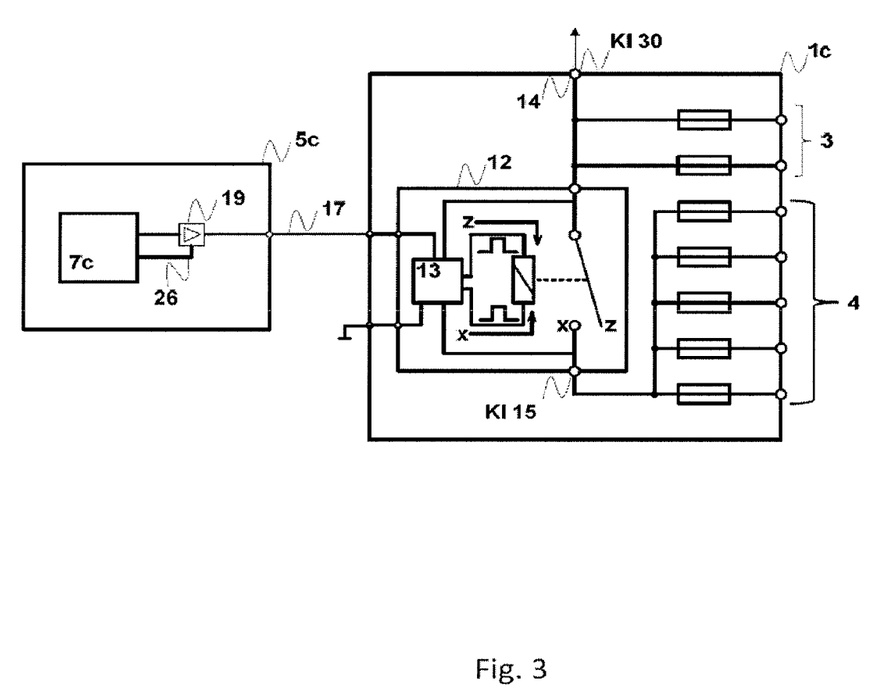
FIG. 3 is a schematic diagram of a vehicle's electrical and electronic system with a control unit, a power distributor and a bistable relay with an integrated circuit in accordance with an exemplary embodiment of the invention.
Figure 4:
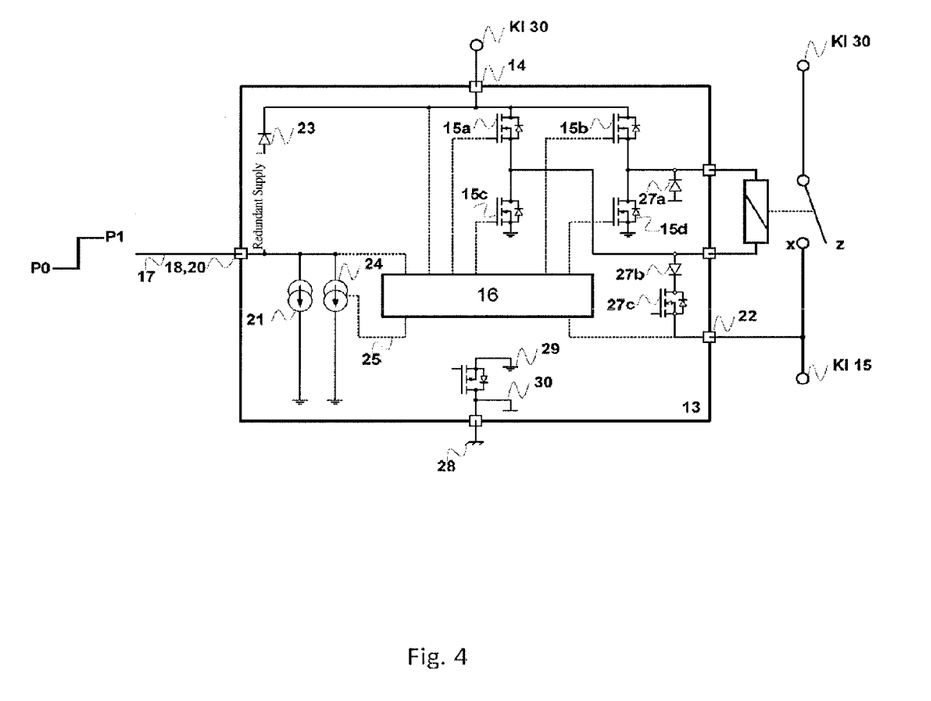
FIG. 4 is a block diagram of the integrated circuit of a bistable relay.

Details of the integrated circuit 13 of the bistable relay in FIG. 3 are shown in FIG. 4. The integrated circuit 13 in FIG. 4 has an H-bridge circuit consisting of four self-blocking n-channel MOSFETs (15a, 15b, 15c, 15d). The H-bridge circuit is connected to the terminal 30 on the drain side and to ground on the source side, so that the coil of the bistable relay forms the H-bridge. Technology demands that each substrate diode be connected in parallel in the blocking direction to the MOSFETs. A logic module 16 controls the gate electrodes of the MOSFETs, in order to generate a current pulse through the coil in a defined direction of current. In this case a defined direction of current correlates with a defined switching state of the relay. In the example depicted in FIG. 3, the availability of a gate voltage, that is a gate source voltage, which is above the forward voltage of the GS diode, at the MOSFET 15a and at the MOSFET 15d means a current pulse in the direction (marked (x)) of switching the relay over into the first switching state (here: the closing) of the relay. The switching of the MOSFETs 15b and 15c correlates with the reverse current direction (z) and the second switching state, that is the opening of the relay. The logic module 16 controls the gate voltages as a function of a control signal of the control unit 5c; and this control signal is guided to a control input (18, see FIG. 4) of the logic module by way of a control line 17 between the control unit 5c and the ASIC 13.

The control signal has a first control voltage level (P1) as the logical "1", which is designed as the high level, and a second control voltage level (P0) as the logical "0", which is designed as the low level. In FIGS. 3 and 4 the high level correlates with the first switching state, that is with the "ON" relay and the direction of current (x).

The setting of the first control voltage level and the setting of the second control voltage level can be implemented with a high side driver 19, which is included in the control unit shown in FIG. 3. The high side driver 19 is switched by a microcontroller 7c of the control unit 5c, in which the operating strategy of the relay is stored. The control line 17 from the control unit to the ASIC of the bistable relay is connected to the input of the ASIC by way of a plug and socket connection (20, see FIG. 4). The high level lies in the range of the voltage of the electrical system of the vehicle; the low level has no voltage.

The integrated circuit can have a first current sink 21 between the ASIC and the logic module. This current sink ensures a low current flow in the range of a few mAs at the set high level, so that the plug and socket connection is kept as free as possible of contact resistances that form due to oxidation. This current, called the "contact cleaning current", guarantees the reliability of the system. The power loss of approximately 0.01 W due to the contact cleaning current can be virtually ignored.

Furthermore, the logic module 16 is provided with a diagnostic function of the bistable relay. The diagnosis can be based on a voltage measurement. For this purpose, the potential is tapped 22 at the current path, which is to be switched over to the terminal 30; and the potential difference is measured against the operating voltage (also terminal 30) available at the integrated circuit. In the event that a potential difference occurs, the relay is in the "OFF" switching state; in the event of a vanishing potential difference, in the "ON" switching state. Within the framework of the diagnostic function the logic module compares the determined switching state with the switching state defined by the control unit.

If the diagnostic function determines a discrepancy between the determined switching state and the defined switching state, the logic module resets the relay by selecting the gate electrodes, as described above. As a result, the advantage of automatically resetting a monostable relay in the event of a crash is also provided with a bistable relay according to FIGS. 3 and 4.

The integrated circuit has a diode 23 between the operating voltage input of the logic module and the control line input. When a high level is available at the control line, the circuit can also be supplied with operating voltage by way of the control line. This redundant voltage supply makes possible the diagnostic functionality even if the voltage supply of the ASIC fails (due to a break in the line between the terminal 30 and the operating voltage input) and ensures that even then the relay can be switched over into the "ON" switching state.

A second current sink 24 is connected in parallel to the first current sink 21. The second current sink 24 can be switched by a pulse width modulated signal 25 of the logic module 16. When the sink is turned on, and at the level P1, a status current that exceeds the contact cleaning current by a multiple (here by about 10 times) flows for the duration of the pulse width.

In FIG. 3, the control unit 5c or the driver 19 is provided, for example, with a current mirror circuit 26. This feature allows the control unit to detect in a time resolved manner the status current. Since the different operating states of the bistable relay correlate with the different pulse widths in the logic module and in the microcontroller 7c, the result is that status information about the relay can be transmitted to the control unit. Depending on the range of functions of the logic module, different status data can be transmitted, for example the switching state of the relay, the status of the voltage supply at the operating voltage input or a defect of the relay coil in the event of a constant deviation between the defined and the determined switching state.

In addition, the ASIC enables the integration of an inexpensive reverse polarity protection in the vehicle. If a defective battery or a depleted battery makes it necessary to carry out a remote start at the vehicle, then the result may be a reverse polarity. In the case of a reverse polarity, it is the minus pole of an external charge source and not the plus pole that is brought into contact with the plus pole of the defective vehicle battery or with the remote start polarity of the vehicle. As a result, the terminal 30 is at a lower potential than the terminal 15 (vehicle body, 28). In this case sensitive consumers 4 can be damaged, if the relay is closed. In order to prevent this, the integrated circuit has the two diodes 27a and 27b. Both diodes are switched over, relative to a higher potential at the terminal 15 than at the terminal 30, into the forward direction by way of the unprotected ground 30, so that when the relay is closed, a current flows through the coil in the z direction and opens the relay ("OFF" switching state). The functionality of the reverse polarity protection is independent of the functionality of the logic module. The reverse polarity protection can be supplemented with an inversely self-blocking n-channel MOSFET between the protected ground 29 and the unprotected ground 30.

As an alternative to FIGS. 3 and 4, the control unit with the high side driver 19 and the integrated circuit can function on the basis of signals that are inverted relative to FIGS. 3 and 4. Then the level P0 corresponds to a higher potential than the level P1, where the level P1 corresponds to the (x) current direction. At level P1 there is a contact cleaning current and a status current, which are generated by current sources, instead of current sinks 21, 24.

On the whole, a bistable relay with an integrated circuit according to FIGS. 3 and 4 offers many advantages. The power loss for switching the relay 12 is a fraction of that of a monostable relay 2 and is nearly as low as in the case of a bistable relay without an ASIC 10. In comparison to a bistable relay without an ASIC, it is possible to dispense with a cable strand from the control unit to the relay and the cost intensive full bridge driver, so that the weight and cost of materials can be reduced. Another advantage follows from the integration of the ASIC into the bistable relay, instead, for example, into the control unit. If the ASIC were integrated into the control unit, three cable strands (two cable strands for supplying power to the coil and one cable strand for tapping the voltage) from the control unit to the relay would be necessary. In the event of a crash a switching state of the relay can be automatically restored by the diagnostic function, so that the usage spectrum of bistable relays is increased in the vehicle. In addition, sensitive consumers of the vehicle, in particular, control units, are protected by the reverse polarity protection function; in the event of reverse polarity by the automatic opening of the relay.

Bistable relays with an integrated circuit could be used in a magnitude of 5 to 15 per vehicle in future motor vehicles and/or in future electric vehicles. Thus, bistable relays with an ASIC could help to expand the range of functions of the vehicle while simultaneously reducing the weight and fuel consumption or extending the cruising range.

LIST OF REFERENCE NUMERALS

1a, 1b, 1c: power distributor, junction box
2: monostable relay
3: consumer at terminal 30 (Kl 30)
4: consumer at terminal 15 (Kl 15)
5a, 5b, 5c: control unit
6a, 6b, 6c: switching line
7a, 7b, 7c: microcontroller
8a: high side driver
10: bistable relay
11: full bridge driver
12: bistable relay with integrated circuit (ASIC), intelligent relay
13: integrated circuit, ASIC
14: operating voltage input
15a, 15b, 15c, 15d: self-blocking n-channel MOSFET
16: logic module
17: control line
18: control input
19: high side driver for ASIC
20: socket and plug connection
21: first current sink
22: voltage tap
23: diode for redundant voltage supply
24: second current sink
25: pulse width modulated signal
26: current mirror circuit
27a, 27b, 27c: reverse polarity protection
28: vehicle body, terminal 31
29: protected ground
30: unprotected ground
P1: high level, first control voltage
P0: low level, second control voltage
x: current direction for closing the relay (12), correlates with P1
z: current direction for opening the relay (12), correlates with P0

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a control unit;
   a power distributor comprising a bistable relay having at least one coil;
   wherein the bistable relay comprises an integrated circuit, the bistable relay being settable to first and second switching states;
   wherein the control unit is operatively configured to activate the integrated circuit of the bistable relay via a single control line, the control unit defining one of the first and second switching states by way of a control signal, wherein the control unit is electrically connected to the bistable relay only by way of the single control line;
   wherein the control unit applies a first control voltage or a second control voltage as the control signal to the single control line, the first control voltage corresponding to the first switching state and the second control voltage corresponding to the second switching state; and
   wherein the integrated circuit is operatively configured to switch a current pulse through the at least one coil in order to set the bistable relay to the switching state defined by the control unit.

2. The vehicle according to claim 1, wherein the integrated circuit is operatively configured to determine the switching state of the relay, the integrated circuit comparing the determined switching state of the relay with a defined switching state of the control unit; and
   wherein, in an event that the determined switching state differs from the defined switching state, the integrated circuit switches a current pulse through the coil in order to set the bistable relay to the switching state defined by the control unit.

3. The vehicle according to claim 2, wherein the integrated circuit comprises:
a bridge circuit having four self-blocking n-channel MOSFETs;
a logic module, wherein:
the logic module controls gate electrodes of the n-channel MOSFETs as a function of the control signal of the control unit in order to switch a current pulse through the at least one coil and set the defined switching state.

4. The vehicle according to claim 2, further comprising:
a voltage source; and
wherein the integrated circuit has an operating voltage input, the integrated circuit being supplied by the voltage source with electric voltage at the operating voltage input.

5. The vehicle according to claim 2, wherein the integrated circuit comprises a reverse polarity protection circuit, the reverse polarity protection function opening or closing the bistable relay when an external voltage source is connected with reverse polarity.

6. The vehicle according to claim 1, wherein the integrated circuit comprises:
a bridge circuit having four self-blocking n-channel MOSFETs;
a logic module, wherein:
the logic module controls gate electrodes of the n-channel MOSFETs as a function of the control signal of the control unit in order to switch a current pulse through the at least one coil and set the defined switching state.

7. The vehicle according to claim 6, further comprising:
a voltage source; and
wherein the integrated circuit has an operating voltage input, the integrated circuit being supplied by the voltage source with electric voltage at the operating voltage input.

8. The vehicle according to claim 6, wherein the integrated circuit comprises a reverse polarity protection circuit, the reverse polarity protection function opening or closing the bistable relay when an external voltage source is connected with reverse polarity.

9. The vehicle according to claim 1, further comprising:
a voltage source; and
wherein the integrated circuit has an operating voltage input, the integrated circuit being supplied by the voltage source with electric voltage at the operating voltage input.

10. The vehicle according to claim 9, wherein:
the integrated circuit has a redundant voltage supply, wherein
when a voltage supply at the operating voltage input fails, the integrated circuit is supplied with electric voltage via the control unit by way of a selection line.

11. The vehicle according to claim 1, wherein:
the integrated circuit has a control line input;
the control line is connected to the control line input via a plug and socket connection;
a first current sink is operatively arranged downstream of the control line input; and
wherein a contact cleaning current is adjustable via the first current sink by way of the control line.

12. The vehicle according to claim 11, wherein:
a second current sink is connected in parallel to the first current sink;
a status current is adjustable by the second current sink by way of the control line;
a setting of the status current is controlled by a pulse width modulated signal of a logic module for switching to the second current sink;
a pulse width modulated status current is determinable by the control unit with a current mirror circuit; and
information is storable as a function of the pulse width of the pulse width modulated status current in the logic module and in the control unit.

13. The vehicle according to claim 1, wherein the integrated circuit comprises a reverse polarity protection circuit, the reverse polarity protection function opening or closing the bistable relay when an external voltage source is connected with reverse polarity.

14. The vehicle according to claim 1, wherein the vehicle is one of an internal combustion engine vehicle, a hybrid vehicle, and an electric vehicle; and
wherein the power distributor has a plug-in space in order to integrate the at least one bistable relay comprising the integrated circuit.

* * * * *